Patented Oct. 13, 1931

1,826,895

UNITED STATES PATENT OFFICE

WOLF JOHANNES MÜLLER AND HEINRICH HILLER, OF VIENNA, AUSTRIA

PROCESS FOR THE PREPARATION OF ALUMINA

No Drawing. Application filed October 4, 1929, Serial No. 397,442, and in Austria September 21, 1927.

This invention relates to the preparation of alumina from bauxite, and has for its object to provide an improved process for this purpose.

For preparing alumina from bauxite it is known to treat the bauxite with a liquid called "aluminate lye" which is obtained in the following manner: When starting the process, bauxite is decomposed by the action of a caustic soda solution; the solution, after having been used for this purpose, contains sodium hydroxite, varying quantities of sodium aluminate and a small amount of sodium carbonate; this liquid is very suitable for decomposing further quantities of bauxite provided the ratio of $Al_2O_3 : Na_2O$ be 1:4, 5 up to 6. A liquid being thus composed will be hereinafter referred to as "aluminate lye".

According to the known process of K. J. Bayer bauxite is treated at temperatures of 160–172° and at a pressure of 6 to 7 atm. with aluminate lye of 40–44° Bé. in an autoclave for from one and a half up to two hours. The liquid is then diluted to about 20–24° Bé., filtered off from the substances (red slime) not dissolved, then inoculated with alumina hydrate and stirred thus causing the alumina hydrate to separate from the solution.

The liquid, after being filtered from the solid precipitate is concentrated to 44° Bé. by evaporation and is then ready to be used again. The continuous dilution and repeated evaporation of the liquid is, however, a technical and economical disadvantage of the process, which means much work, a great expenditure of heat, and, in addition to a considerable requirement of space, also involves the high costs of manufacture.

The proposition has already been made to use no liquid of higher concentration than 38° Bé. at the utmost, that is of the specific gravity of 1, 36; thus, however, the dilution and evaporation is not avoided. Experiments have also been described for carrying out the decomposition at about 170° with the aluminate lye of 22° Bé. We have, however, ascertained that this lye at 170° does not permit of any technically sufficient decomposition.

We have now discovered, that the decomposition of the bauxite can be effected even with an aluminate lye of about 20–22° Bé., if the decomposition is carried out above about 190° C., the pressure being at this temperature automatically increased to about 10–15 atm. or higher. The corresponding pressure thus obtained is just sufficient to permit ebullient boiling of the solution at the chosen temperature.

We use for carrying out the process an aluminate lye, in which the ratio of $Al_2O_3 : Na_2O$ is for instance 1:5, 5 and into which so much bauxite is introduced that the proportion is brought to about 1:1, 8 as usual.

It is known that the composition of the alumina hydrate present in the bauxite is different according to the origin of the stratum. In consequence of this difference of the molecular construction of the alumina hydrate the yield of soluble alumina can be brought to the same amount by using different temperatures of the decomposing liquid.

The result of the above described manner of working may be illustrated by the following examples:

*Example 1.*—A bauxite from Salzburg (Austria) having the following composition:

| | Per cent |
|---|---|
| $SiO_2$ | 1, 9 |
| $Al_2O_3$ | 52 |
| $Fe_2O_3$ | 29 |
| $TiO_2$ | 3, 5 | is decomposed by treatment with aluminate lye of 22° Bé. at 200° C.; the pressure at this temperature amounts to 18 atm. The yield is 96 per cent. of the alumina contained in the bauxite, the decomposition being practically complete.

The improvement may be seen from a comparison with the old process, by which only 70 per cent. of the alumina present in the bauxite are obtained.

*Example 2.*—A bauxite from Hungary of the following composition:

| | Per cent |
|---|---|
| $SiO_2$ | 4, 5 |
| $Al_2O_3$ | 54 |
| $Fe_2O_3$ | 24 |
| $TiO_2$ | 3, 5 | is decomposed with an aluminate lye of 22° Bé. at 230° C. and a pressure of 25 atm. The output of alumina is 62 per cent. when the temperature is raised to 280–290° C. and the pressure to 100 atm. 93 per cent. of the alumina contained in the bauxite are obtained.

The known process of Bayer only yields 36 per cent. alumina.

The process may be carried out in practice by working in an autoclave either discontinuously as usual in the known processes or, in a more advantageous modification, by working continuously. The autoclave may for instance be shaped in the form of a heating coil within which the mixture of bauxite and aluminate lye is kept in continuously progressive movement by means of a high pressure pump and leaves the reaction chamber through a weighted valve or a counter pressure pump. In this arrangement the heat contained in the mass may be used for preheating the starting mixture. The red slime is separated from the solution in the usual manner, for instance by a continuously working filter and the alumina hydrate caused to separate from the solution, from which it is removed in a manner known per se.

The residual aluminate lye obtained after separation of the precipitated hydrate is led back into circulation without concentration, the washing liquid either serving for the preparation of fresh caustic soda solution, which can be used for providing the necessary caustic soda amount, or being concentrated by evaporation to the concentration of 20–22° Bé.

What we claim is:—

1. A process for preparing alumina from bauxite, which comprises heating bauxite with aluminate lye of approximately 20° to 22° Bé. at temperatures above 190° C. and corresponding pressures until the decomposition of the bauxite is substantially complete.

2. A process for preparing alumina from bauxite, which comprises heating bauxite with aluminate lye of approximately 22° Bé. at temperatures above 190° C. and corresponding pressures until the decomposition of the bauxite is substantially complete.

In testimony whereof we affix our signatures.

WOLF JOHANNES MÜLLER.
HEINRICH HILLER.